United States Patent [19]

Ohkumo

[11] Patent Number: 4,730,712
[45] Date of Patent: Mar. 15, 1988

[54] SYSTEM FOR CONTROLLING A CLUTCH FOR A MOTOR VEHICLE

[75] Inventor: Hiroya Ohkumo, Koganei, Japan

[73] Assignee: Fuji Jukogyo Kabushiki Kaisha, Tokyo, Japan

[21] Appl. No.: 29,863

[22] Filed: Mar. 24, 1987

[30] Foreign Application Priority Data

Mar. 31, 1986 [JP] Japan .................................. 61-73691

[51] Int. Cl.[4] ...................... F16D 37/02; B60K 41/02; B60K 41/28
[52] U.S. Cl. ................................ 192/0.076; 192/21.5
[58] Field of Search ................. 192/0.076, 21.5, 0.052, 192/0.033, 0.032

[56] References Cited

U.S. PATENT DOCUMENTS 4,425,992 1/1984 Makita ........................ 192/0.076 X
4,494,641 1/1985 Sakakiyama ..................... 192/0.076
4,624,349 11/1986 Watanabe ......................... 192/0.076
4,680,712 7/1987 Sakakiyama et al. ............ 192/0.076

Primary Examiner—Rodney H. Bonck
Attorney, Agent, or Firm—Martin A. Farber

[57] ABSTRACT

A control system for an electromagnetic clutch of a motor vehicle. Idling speed of an engine of the vehicle is increased for providing a fast idle state when a choke valve of the engine is closed. In the fast idle state, initial clutch current is reduced for engaging the clutch at depression of an accelerator pedal, and thereafter the clutch current increasing rate is quickly increased when the engine speed and throttle opening degree become large. When the accelerator pedal is quickly depressed, the reduced rate is increased in accordance with opening degree of a throttle valve for providing quick start of the vehicle.

3 Claims, 10 Drawing Figures

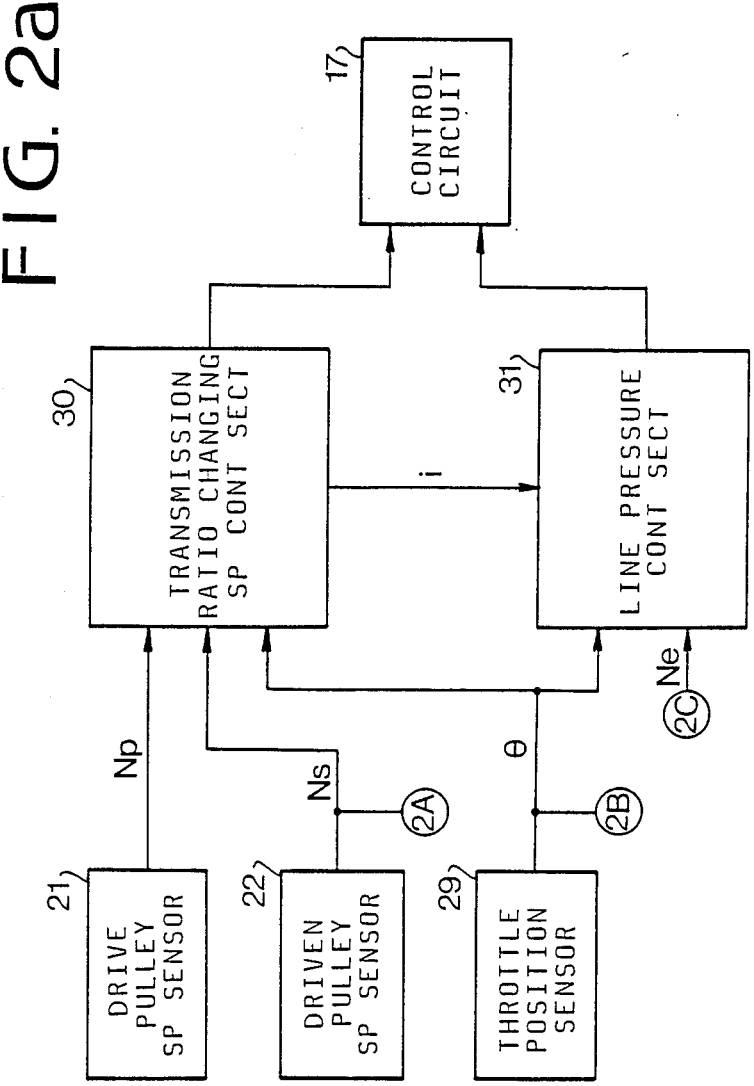

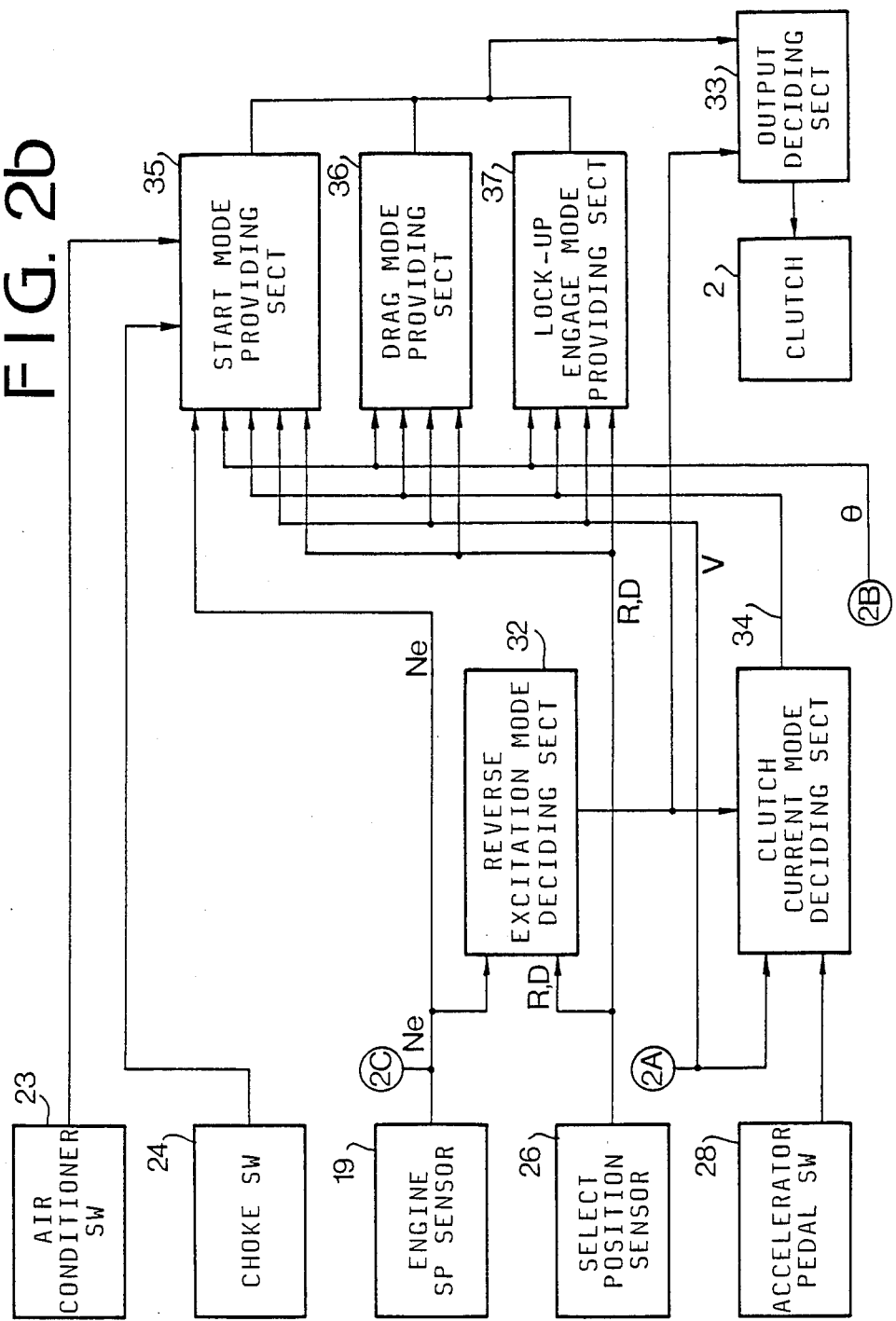

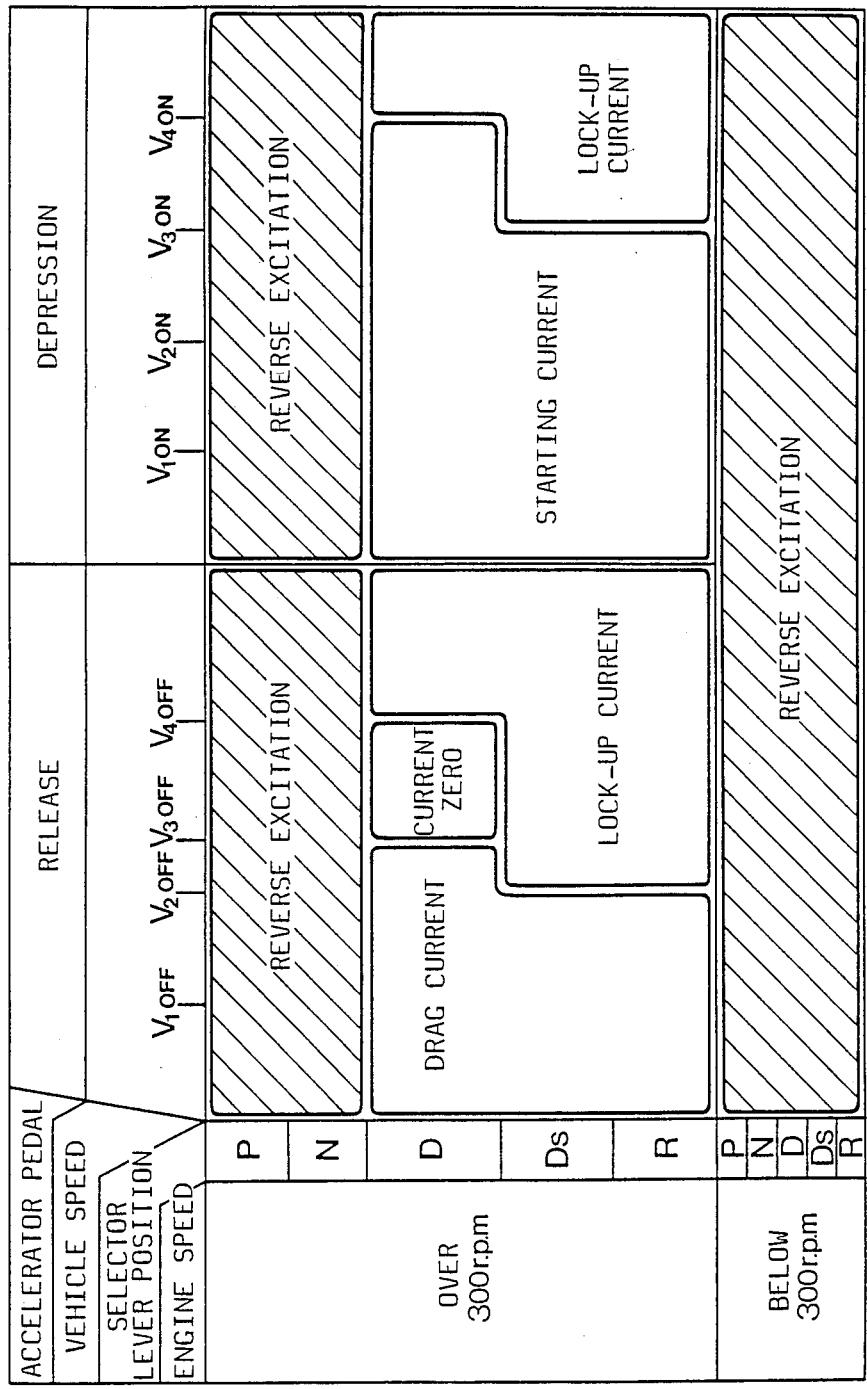

SYSTEM FOR CONTROLLING A CLUTCH FOR A MOTOR VEHICLE

BACKGROUND OF THE INVENTION

The present invention relates to a system for controlling a clutch for an automatic transmission.

An automobile provided with a continuously variable belt-drive transmission with an electromagnetic clutch is disclosed in EP-A 151038.

In the system, the clutch current characteristic for the start of the vehicle is changed, when idle speed is set at a high value for the use of an air conditioner or idle engine speed is increased (fast idle) by closing the choke valve. Namely, when an accelerator pedal is depressed for starting the vehicle, the engine speed is increased more than the fast idle. If the electromagnetic clutch is engaged in an ordinary manner, the vehicle is jerked, causing shocks. In order to smoothly start the vehicle, the system controls to slowly increase the clutch current so as to gradually engage the clutch.

However, such a system causes other problems. For example, in order to start the vehicle at high speed, when the accelerator pedal is quickly depressed to a wide throttle open position, engine speed may exceed a limit speed, and troubles may occur in the engine and clutch since high engine speed continues for a comparatively long time with slipping the clutch.

SUMMARY OF THE INVENTION

The object of the present invention is to provide a system which operates to change the clutch current with time in accordance with the opening degree of the throttle valve of the engine or with engine speed so as to prevent the excessive slip of the clutch.

According to the present invention, there is provided a system for controlling an electromagnetic clutch for a motor vehicle having an accelerator pedal for operating a throttle valve of an engine, comprising means for increasing clutch current of the clutch with time when the accelerator pedal is depressed, a choke valve for increasing idling speed of the engine at cold engine operation, and for providing a fast idle state, first detector means for detecting speed of the engine and for producing an engine speed signal dependent on the speed, second detector means for detecting opening degree of the throttle valve and for producing a throttle signal dependent on the opening degree, third detector means for detecting the fast idle state and for producing a fast idle signal.

The system has first control means responsive to the fast idle signal for decreasing rate of increasing the clutch current at the depression of the accelerator pedal, and second control means responsive to the fast idle signal, and to the engine speed signal, and to the throttle signal for increasing the rate of increasing the clutch current with increase of the engine speed and/or the opening degree of the throttle valve.

The other objects and features of this invention will be apparently understood from the following description with reference to the accompanying drawings.

BRIEF DESCRIPTION OF DRAWINGS

FIGS. 2a and 2b are block diagrams of a control unit according to the present invention;

FIG. 3 is a graph showing regions of various modes;

DETAILED DESCRIPTION OF THE PREFERRED EMBODIMENT

Figure 1:
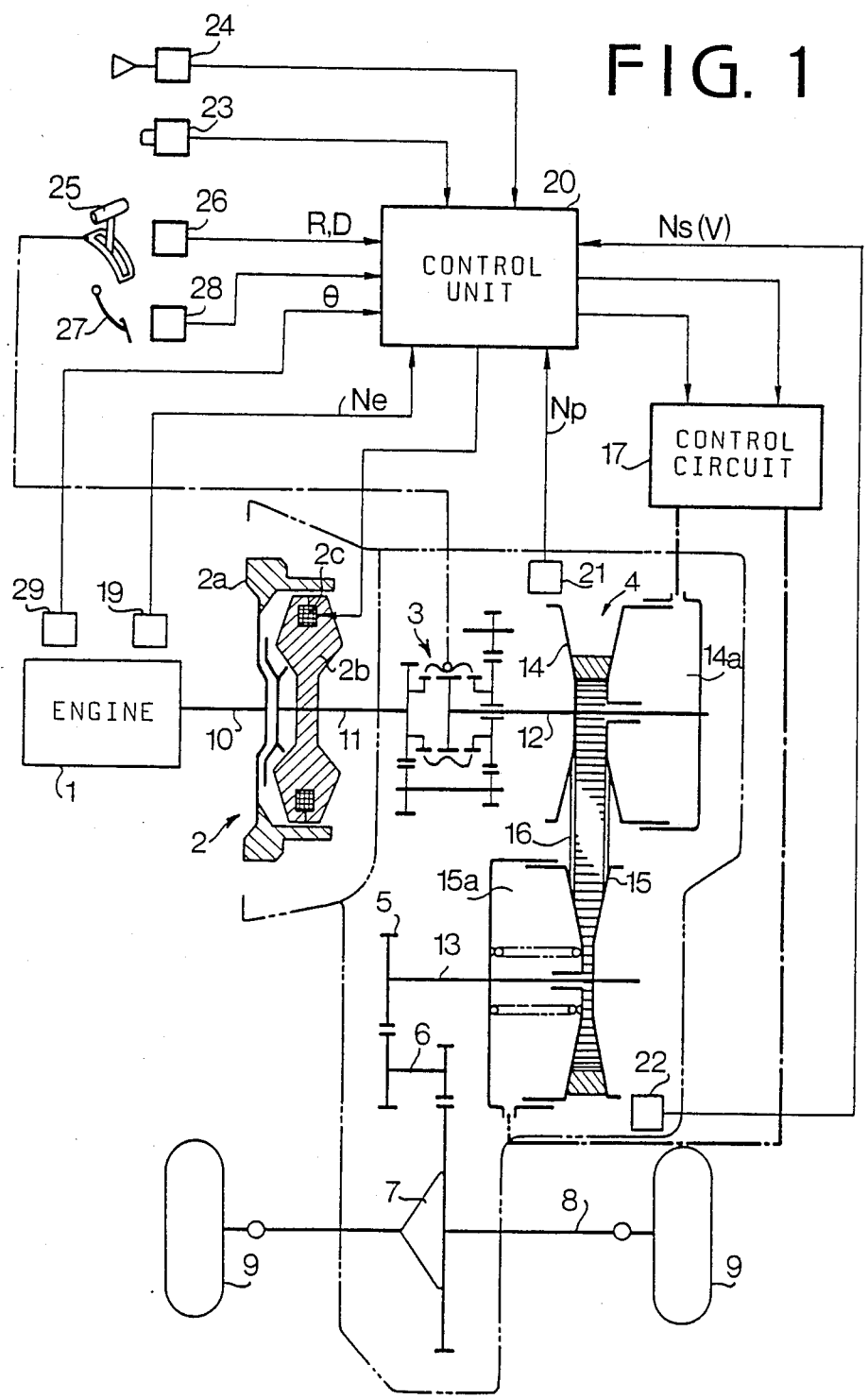
FIG. 1 is a schematic illustration of a system for controlling an electromagnetic clutch for a motor vehicle.
Figure 4:
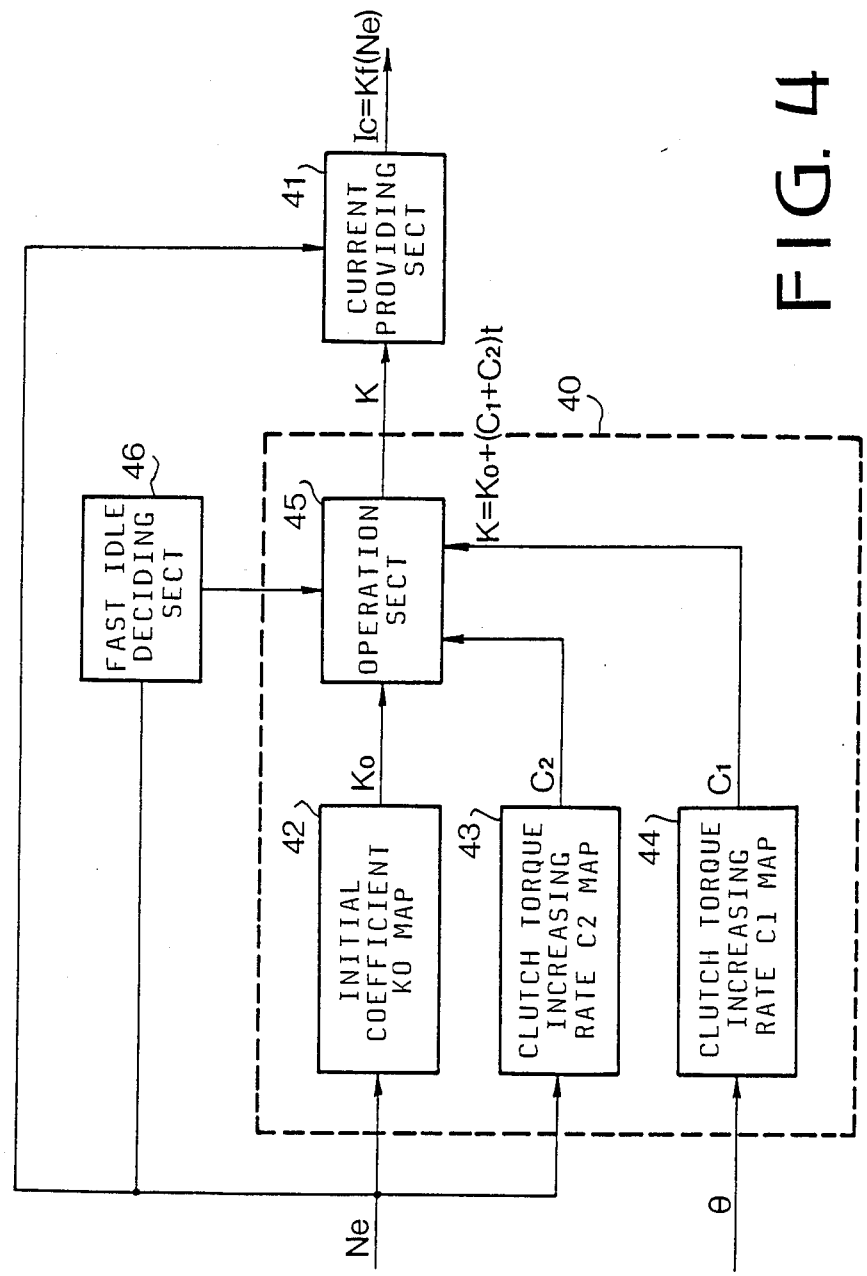
FIG. 4 is a block diagram of a start mode providing section according to the present invention.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to crankshaft 10 of the engine 1, a driven member 2b secured to an input shaft 11 of the transmission 4, and a magnetizing coil 2c provided in the driven member 2b. Powder of magnetic material is provided in a gap between the drive member 2a and driven member 2b. When the magnetizing coil 2c is excited by the clutch current, driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive transmission 4, the selector mechanism 3 is provided between the input shaft 11 and a main shaft 12. The selector mechanism 3 is provided with a synchromesh mechanism comprising gears, hub, and sleeve for connecting the input shaft 11 and the main shaft 12 to selectively provide a driving position (D-range) and a reverse driving position (R-range).

The continuously variable belt-drive automatic transmission 4 has the main shaft 12 and the output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt engages with the drive pulley 14 and the driven pulley 15. Hydraulic cylinders 14a and 15a are communicated with an oil hydraulic control circuit 17. The hydraulic control circuit 17 is responsive to vehicle speed, engine speed and throttle valve position for controlling the amount of oil supplied to the cylinders 14a and 15a. The pulleys 14 and 15 are operated by compressive forces of cylinders so that the running diameter of belt 16 is varied to infinitely change the transmission ratio.

An electronic control system for the clutch 2 and the belt-drive transmission 4 has an engine speed sensor 19, and drive pulley speed sensor 21 and driven pulley speed sensor 22 for respectively sensing speeds of drive pulley 14 and the driven pulley 15. A choke switch 24 produces an output signal when a choke valve of the engine 1 is closed, and an air conditioner switch 23 produces an output signal at the operation of an air conditioner. A selector lever 25 connected to the selector mechanism 3 is provided with a select position sensor 26 for sensing a drive position D and a reverse position R. An accelerator pedal switch 28 is provided for sensing the depression of an accelerator pedal 27, and a throttle position sensor 29 is provided.

Output signals and pulses of these switches and sensors are applied to an electronic control unit 20 which produces a clutch current control signal to the clutch 2 and a control signal for controlling the transmission ratio (i) and a line pressure control singal to the control circuit 17.

Referring to FIG. 2 showing the control unit 20 in FIG. 1, a transmission ratio changing speed control section 30 is applied with a drive pulley speed signal $N_P$ of the sensor 21, driven pulley speed signal Ns of the sensor 22, and throttle position signal $\theta$ of the sensor 29 to produce the transmission ratio control signal dependent on a desired transmission ratio changing speed di/dt. A line pressure control section 31 is applied with an engine speed signal Ne of the sensor 19, throttle position signal $\theta$ of the sensor 29, actual transmission speed ratio signal i $(Ns/N_P)$ of the transmission ratio changing speed control section 30 to produce the line pressure control signal dependent on a desired line pressure. These control signals are applied to the control circuit 17 to control the transmission ratio and line pressure of the transmission 4.

A reverse excitation mode deciding section 32 is applied with engine speed signal Ne of the sensor 19 and drive position signal of the select position sensor 26. When the engine speed Ne is below 300 rpm, or the selector lever 25 is at a neutral position (N-range) or a parking position (P-range), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal V from driven pulley speed sensor 22 for deciding driving conditions such as starting mode to produce output signals. The output signals are applied to a start mode providing section 35, drag mode providing section 36, and clutch lock-up engage mode providing section 37.

The start mode providing section 35 decides clutch current of starting characteristic dependent on the engine speed Ne at ordinary start or at closing of the choke switch 24 or air conditioner switch 23. The starting characteristic is corrected by signals from the throttle valve opening degree $\theta$, vehicle speed V, and driving positions of D-range and R-range.

The drag mode providing section 36 decides a small drag current when the accelerator pedal 27 is released at a low speed in each drive position for prodiving a drag torque to the clutch 2 for the smooth start of the vehicle.

The clutch lock-up engage mode providing section 37 decides a lock-up current in response to the vehicle speed V and throttle opening degree $\theta$ at each drive position for entirely engaging the clutch 2. Outputs of sections 35, 36 and 37 are applied to the output deciding section 33 to control the clutch current. A range of each mode is shown in FIG. 3.

Referring to FIGS. 4 and 5a to 5c, the start mode providing section 35 is provided with a coefficient providing section 40 comprising an initial coefficient Ko map 42 applied with engine speed signal Ne, a clutch torque increasing rate C2 map 43 applied with engine speed signal Ne, and another clutch torque increasing rate C1 map 44 applied with throttle valve opening degree signal $\theta$.

Figure 5:
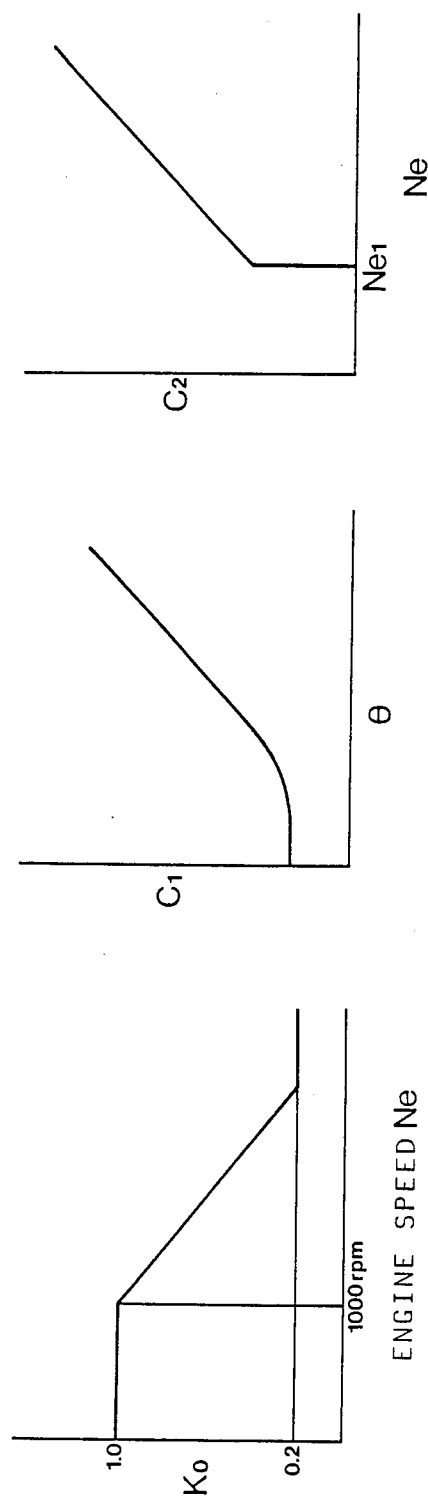
FIGS. 5a to 5c are graphs showing characteristics.

As shown in FIG. 5a, the initial coefficient Ko is a decreasing function of the engine speed Ne. The minimum value of Ko is, for example, determined about 0.2 for preventing the clutch torque from becoming too small. The increasing rate C1 is an increasing function of the throttle valve opening degree $\theta$, as shown in FIG. 5b.

As shown in FIG. 5c, an increasing rate C2 is an increasing function of the engine speed Ne in a range above a predetermined engine speed Ne1. These signals Ko, C1, C2 are applied to an operation section 45 to calculate coefficient K at regular intervals, as follows:

$$K = Ko + (C1 + C2) t$$

A fast idle deciding section 46 applied with an engine speed signal Ne decides whether the engine speed is at an ordinary idling speed or a fast idling speed. When the engine speed Ne is below 1000 rpm or equal to 1000 rpm, an output signal of ordinary idling speed is applied to the operation section 45. In response to the output signal, the operation section 45 produces a coefficient signal of K=1. When the engine speed is higher than 1000 rpm, the operation section 45 produces a fast idle coefficient of K=Ko+(C1+C2) t. The coefficient K and engine speed signal Ne are applied to a current providing section 41.

Figure 6:
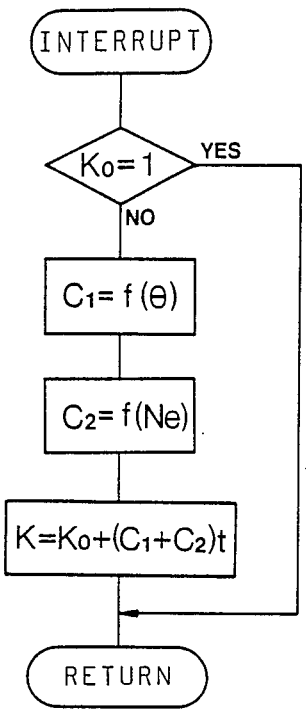
FIG. 6 is a flow chart showing the operation of the start mode providing section.
Figure 7:
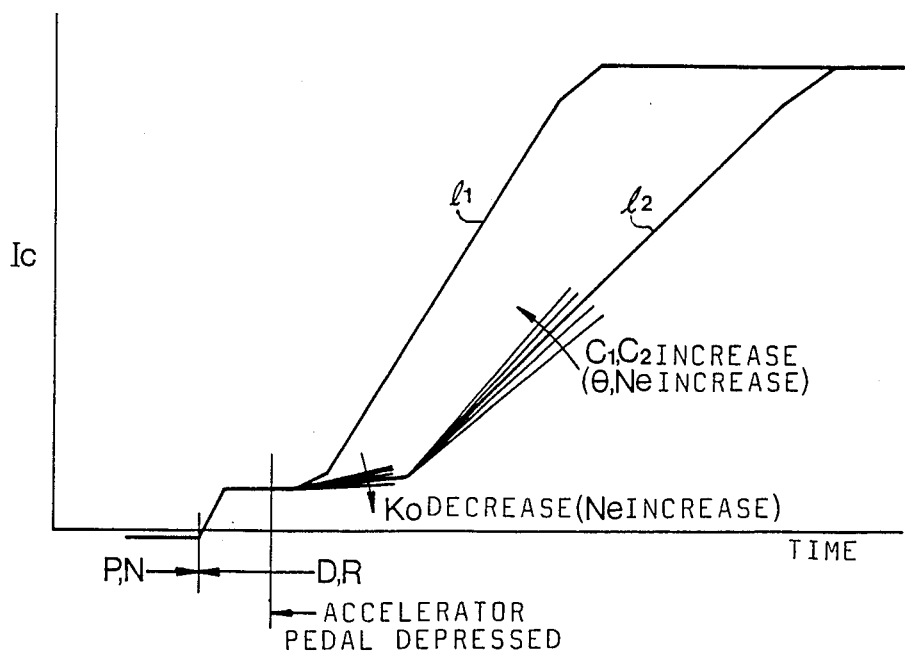
FIG. 7 is a graph showing start characteristics.

FIG. 6 show the interrupt program at the operation section. As described above, when engine speed is at ordinary idling speed, the operation section produces the signal of K=1. Accordingly, the clutch current Ic decided at the current providing section 41 is given by Ic=Kf(Ne)=f(Ne). The clutch current Ic rises in proportion to the engine speed Ne as shown by a line l 1 of FIG. 7. At the fast idling speed, the clutch current Ic is Ic={Ko+(C1+C2)t}f(Ne). As shown by a line l 2 of FIG. 7, the clutch current Ic starts at the initial coefficient Ko and rises at the increasing rate of (C1+C2). In this case, as the fast idling speed becomes large, the initial coefficient Ko becomes small. Accordingly, initial clutch current and hence initial clutch torque is small even though engine idling speed becomes high, thereby smoothly engaging the clutch. Further, as the engine speed Ne and throttle valve opening degree $\theta$ become large, rates C1 and C2 become large. Thus clutch torque increasing speed becomes high, so that the clutch is quickly engaged.

Although the operation at the start of the vehicle is described above, the operation at redepression of the accelerator pedal after releasing of the accelerator pedal during driving of the vehicle is similar to the above described operation.

While the presently referred embodiment of the present invention has been shown and described, it is to be understood that this disclosure is for the purpose of illustration and that various changes and modifications may be made without departing from the spirit and scope of the invention as set forth in the appended claim.

What is claimed is:

1. A system for controlling a clutch for a motor vehicle having an accelerator pedal for operating a throttle valve of an engine, comprising:

first means for increasing clutch torque of the clutch with time when the accelerator pedal is depressed;

second means for increasing idling speed of the engine at cold engine operation, for providing a fast idle state;

first detector means for detecting speed of the engine and for producing an engine speed signal dependent on the speed;

second detector means for detecting opening degree of the throttle valve and for producing a throttle signal dependent on the opening degree;

third detector means for detecting the fast idle state and for producing a fast idle signal;

first control means responsive to the fast idle signal for decreasing rate of increasing the clutch torque at the depression of the accelerator pedal;

second control means responsive to the fast idle signal, to the engine speed signal, and to the throttle signal for increasing the rate of increasing the clutch torque with increase of the engine speed and/or the opening degree of the throttle valve.

2. The system according to claim 1 wherein the clutch is an electromagnetic clutch and first means is means for increasing current passing in a coil in the electromagnetic clutch.

3. The system according to claim 1 wherein the second means is a choke valve of the engine.

* * * * *